US012222780B2

(12) United States Patent
Larocque

(10) Patent No.: US 12,222,780 B2
(45) Date of Patent: Feb. 11, 2025

(54) HEAT RECUPERATION SYSTEM FOR HEATING E.G. GREENHOUSES

(71) Applicant: GESTION MARTIN LAROCQUE INC., Bromont (CA)

(72) Inventor: Martin Larocque, Bromont (CA)

(73) Assignee: GESTION MARTIN LAROCQUE INC., Bromont (CA)

( * ) Notice: Subject to any disclaimer, the term of this patent is extended or adjusted under 35 U.S.C. 154(b) by 709 days.

(21) Appl. No.: 17/057,070

(22) PCT Filed: May 21, 2019

(86) PCT No.: PCT/CA2019/000069
§ 371 (c)(1),
(2) Date: Nov. 19, 2020

(87) PCT Pub. No.: WO2019/222830
PCT Pub. Date: Nov. 28, 2019

(65) Prior Publication Data
US 2021/0141429 A1 May 13, 2021

Related U.S. Application Data

(60) Provisional application No. 62/673,903, filed on May 19, 2018.

(51) Int. Cl.
*G06F 1/20* (2006.01)
*A01G 9/24* (2006.01)
(Continued)

(52) U.S. Cl.
CPC ............... *G06F 1/20* (2013.01); *A01G 9/24* (2013.01); *F24D 19/1039* (2013.01);
(Continued)

(58) Field of Classification Search
CPC ......... G06F 1/20; A01G 9/24; F24D 19/1039; F24D 2200/12; H04L 9/3236; H04L 67/104; H04L 67/141
See application file for complete search history.

(56) References Cited

U.S. PATENT DOCUMENTS 6,747,872 B1 * 6/2004 Patel .................. G06F 1/206
62/263
8,523,643 B1 * 9/2013 Roy .................. H05K 7/20745
454/184
(Continued)

FOREIGN PATENT DOCUMENTS

| CN | 207050074 | 2/2018 |
| CN | 108980973 | 12/2018 |
| CN | 109028652 | 12/2018 |
| WO | 2018/130627 | 7/2018 |

OTHER PUBLICATIONS

Nguyen et al., Apr. 15, 2018 (Apr. 15, 2018) Reusing Waste heat from Cryptocunency Mining to Heat Multi-Family House.

*Primary Examiner* — Raheena R Malik
(74) *Attorney, Agent, or Firm* — Benoit & Côté Inc.; Michel Sofia

(57) ABSTRACT

A heat recuperating system is adapted for recuperating heat generated by mining devices, s.g. cryptocurrency miners, and for using the recuperating heat in agri-food industry applications. The heat recuperating system comprises a technical room comprising an air supply area, an exhausted air area and a computation area dividing the air supply area from the exhausted air area, wherein the computation area houses the mining devices. The heat recuperating system also comprises a heat exchanger system recuperating heat from the exhausted air area of the technical room and transmitting the recuperated heat to the agri-food industry applications. An associated method comprises supplying a technical room comprising a computation area wherein the (Continued)

SITE PLAN VIEW mining devices are operating; supplying a heat exchanger system recuperating heat generated by the mining devices when operating; and transmitting the recuperated heat to the agri-food industry applications.

18 Claims, 8 Drawing Sheets

(51) Int. Cl.
  F24D 19/10     (2006.01)
  H04L 9/32      (2006.01)
  H04L 67/104    (2022.01)
  H04L 67/141    (2022.01)
(52) U.S. Cl.
  CPC .......... *H04L 9/3236* (2013.01); *H04L 67/104* (2013.01); *H04L 67/141* (2013.01); *F24D 2200/12* (2013.01)

(56) References Cited

U.S. PATENT DOCUMENTS

| | | | | |
|---|---|---|---|---|
| 8,605,435 | B1* | 12/2013 | Ashby | H05K 7/20736 |
| | | | | 361/695 |
| 10,531,597 | B1* | 1/2020 | Eichelberg | F24F 5/0035 |
| 11,337,381 | B1* | 5/2022 | Nelson | G06Q 50/02 |
| 11,384,989 | B2* | 7/2022 | Zhang | F28D 1/0478 |
| 11,638,364 | B1* | 4/2023 | Landry | G06F 1/206 |
| | | | | 361/679.49 |
| 2009/0114370 | A1 | 5/2009 | Konig | |
| 2010/0141105 | A1 | 6/2010 | Slessman | |
| 2011/0279976 | A1* | 11/2011 | Mikami | G06F 1/206 |
| | | | | 361/696 |
| 2016/0270262 | A1 | 9/2016 | Crawford | |
| 2018/0087841 | A1* | 3/2018 | Zhang | F28F 1/128 |
| 2019/0338962 | A1* | 11/2019 | Minnoy | F24D 17/02 |
| 2021/0141429 | A1* | 5/2021 | Larocque | H04L 67/104 |
| 2021/0381715 | A1* | 12/2021 | Rosén | F24F 11/67 |
| 2022/0003429 | A1* | 1/2022 | Rosén | F24D 11/0207 |

\* cited by examiner

BLOCK DIAGRAM

HEAT RECOVERING SYSTEM
PLAN VIEW

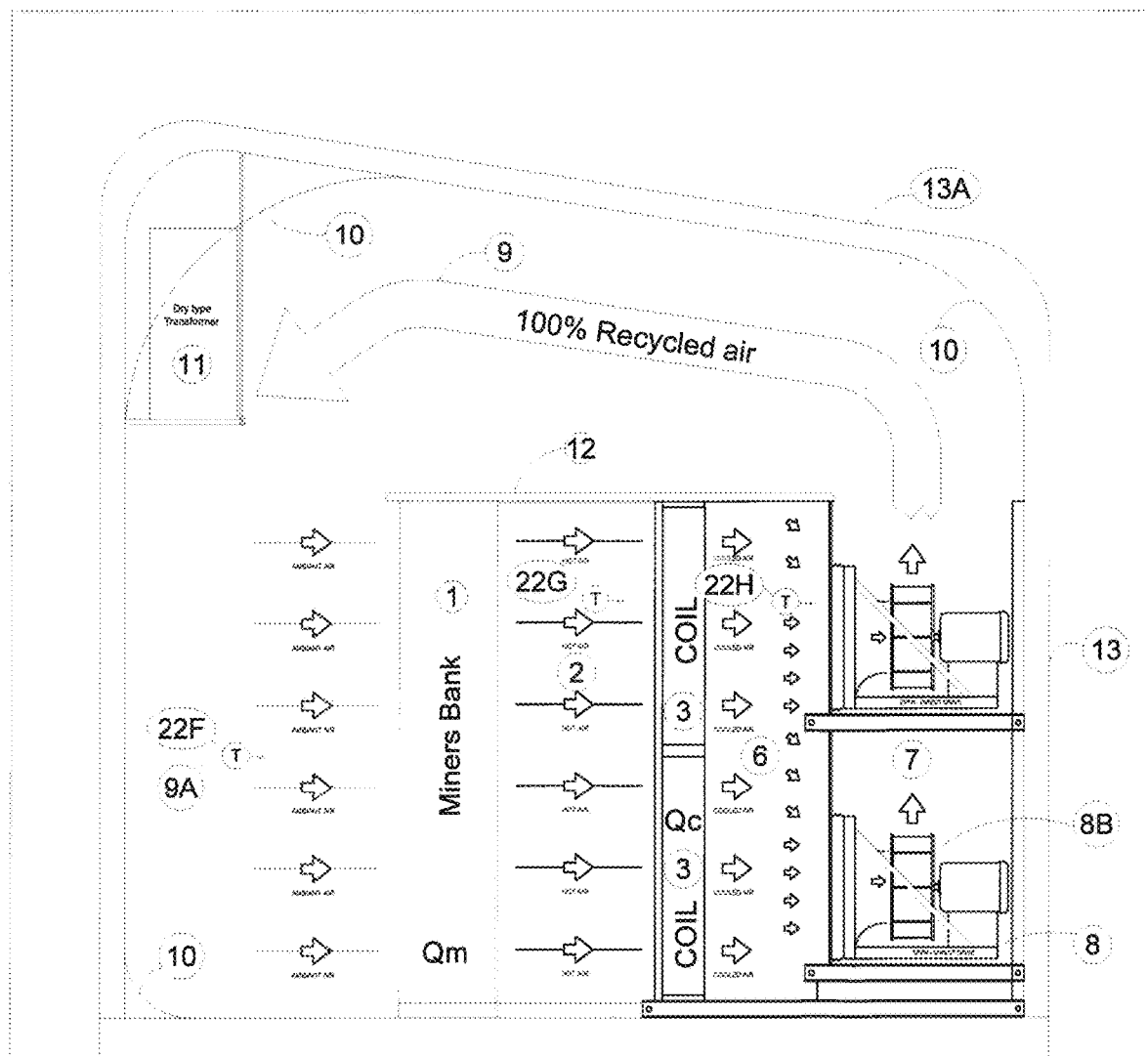
Mining Room – Fig. 8

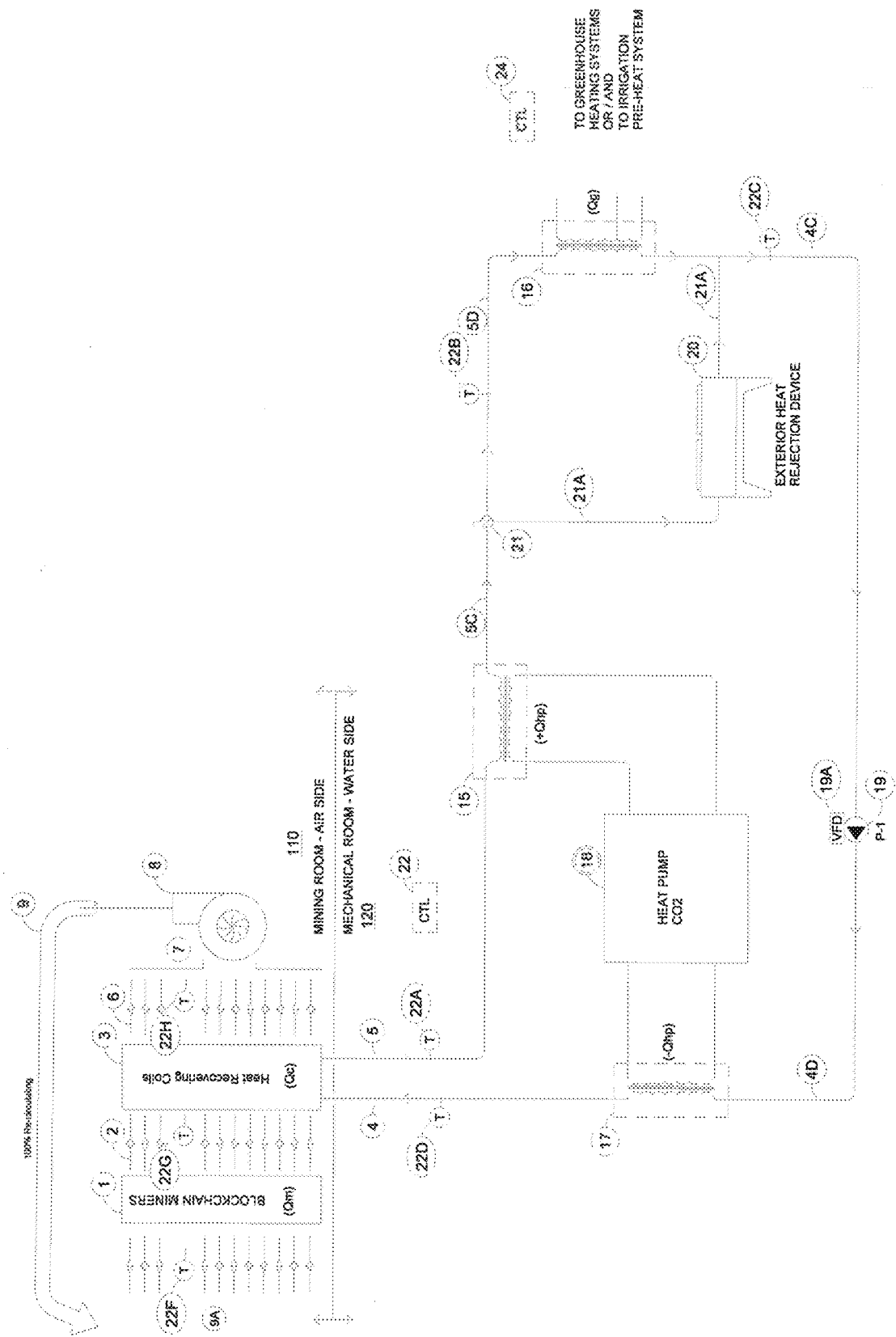

HEAT RECUPERATION SYSTEM FOR HEATING E.G. GREENHOUSES

CROSS REFERENCE TO RELATED APPLICATIONS

This application claims priority on U.S. Provisional Application No. 62/673,903, filed on May 19, 2018, which is herein incorporated by reference.

FIELD

The present subject-matter relates to the recuperation of heat and, more particularly, to heat recovery for use in heating greenhouses.

BACKGROUND

The benefits of greenhouses are well known. However, in certain conditions, such as in cold climate lands, significant heating is required to operate such greenhouses. Various heating systems and heating sources have been proposed, but the high cost of the heating sources is a deterrent to efficiently and profitability and thus commercially using these greenhouses.

Therefore, it would be desirable to provide an apparatus and/or a method for greenhouses to be affordably heated.

It would thus be desirable to provide a novel apparatus and/or method for heating greenhouses that takes advantages of drawbacks of other technologies, i.e. the Blockchain technology.

SUMMARY

It would thus be desirable to provide a novel apparatus and/or method for heating greenhouses that takes advantages of drawbacks of other technologies, i.e. the Blockchain technology.

According to an embodiment, there is provided a heat recuperating system for recuperating heat generated by mining devices to be used in agri-food industry applications. The heat recuperating system comprises a technical room comprising an air supply area, an exhausted air area and r computation area dividing the air supply area from the exhausted air area, wherein the computation area houses the mining devices; and a heat exchanger system recuperating heat from the exhausted air area of the technical room and transmitting the recuperated heat to the agri-food industry applications.

According to an aspect, the heat recuperating system further comprises a system controller and a plurality of sensors transmitting signals to the system controller, with the system controller, according to sensor signals, driving the heat recuperating system.

According to an aspect, the heat recuperating system comprises a system controller and a plurality of sensors, and further comprises a heat rejection means adapted to controllably collect heat from or reject heat into environment, with the heat exchanger system being adapted to controllably drive recuperated heat further to the heat rejection means.

According to an aspect, the heat recuperating system comprises airflow driving means to drive an airflow from the air supply area to the exhausted air area.

According to an aspect, the heat recuperating system comprising an airflow driving means has the computation area comprising a mounting component adapted to mount the mining devices parallel to each other; and an opening fluidly connecting the air supply area to the mounting component wherein the mounting component is oriented for the airflow to travel between the mining devices.

According to an aspect, the heat recuperating system comprising an airflow driving means has comprising a conduit fluidly connecting the exhausted air area and the air supply area, with the airflow driving means driving the airflow from the exhausted air area to the air supply area.

According to an aspect, the heat exchanger of the heat recuperating system comprises at least one of a) a fan coil; b) a thermal storage tank; c) a water heater adapted for preheating cold water; d) a radiant heating system adapted for crops tables; and e) a greenhouse watering system, through which the heat exchanger is adapted to transmit recuperated heat to the agri-food industry applications.

According to an aspect, the heat recuperating system comprises a high-speed communication means for connecting the mining devices to Internet.

According to an aspect, the heat recuperating system comprises a dust control system, wherein the dust control system provides a dust-free airflow for cooling down the mining devices.

According to an embodiment, there is provided a method of recuperating heat generated by mining devices to be used in agri-food industry applications. The heat recuperating method comprises supplying a technical room comprising a computation area wherein the mining devices are operating; supplying a heat exchanger system recuperating the heat generated by the mining devices when operating; and transmitting the recuperated heat to the agri-food industry applications.

According to an aspect, the method of recuperating heat comprises connecting the mining devices to Internet, and registering the mining devices in a peer-to-peer network.

According to an aspect, operating the mining devices according to the method of recuperating heat comprises the mining devices performing hash functions.

According to an aspect, the method of recuperating heat comprises connecting the mining devices to Internet; and registering the mining devices into a cryptocurrency network, whereby the mining devices performs mining operations.

According to an aspect, the method of recuperating heat comprises connecting the mining devices to internet; and registering the mining devices into a network operating according to a protocol of decentralized transactions.

According to an aspect, wherein the mining devices according to the method of recuperating heat are cryptocurrency miners.

According to an aspect, the technical room according to the method of recuperating heat comprises an air supply area and an exhausted air area, and wherein the computation area divides the air supply area from the exhausted air area.

According to an aspect, the method of recuperating heat comprises supplying a system controller; and supplying a plurality of sensors transmitting signals to the system controller, with the system controller, according to sensor signals, driving the heat recuperating system.

According to an aspect, the method of recuperating heat comprises supplying a heat rejection means adapted to reject the heat into environment, wherein the heat exchanger system is adapted to controllably drive recuperated heat further to the heat rejection means.

According to an aspect, the method of recuperating heat comprises supplying at least one of a) a fan coil; b) a thermal storage tank; c) a water heater adapted for preheating cold water; d) a radiant heating system adapted for crops tables;

and e) a greenhouse watering system, through which the heat exchanger system is adapted to transmit the recuperated heat to the agri-food industry applications.

According to an aspect, the method of recuperating heat comprises monitoring heat requirements of the agri-food industry applications; and one of increasing and decreasing an operating number of the mining devices based on the monitored heat requirements.

Features and advantages of the subject matter hereof will become more apparent in light of the following detailed description of selected embodiments, as illustrated in the accompanying figures. As will be realized, the subject matter disclosed and claimed is capable of modifications in various respects, al without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

For a better understanding of the embodiments described herein and to show more clearly how they may be carried into effect, reference will now be made, by way of example only, to the accompanying drawings, which show at least one exemplary embodiment, and in which:

FIG. 8 is a sectional side view along cutting line A-A of the heat recovery system of FIG. 7; and FIG. 9 is a schematic illustrating the components and heat exchange taking place in a heat recovery system in accordance with an embodiment.

DESCRIPTION OF VARIOUS EMBODIMENTS

Figure 1:
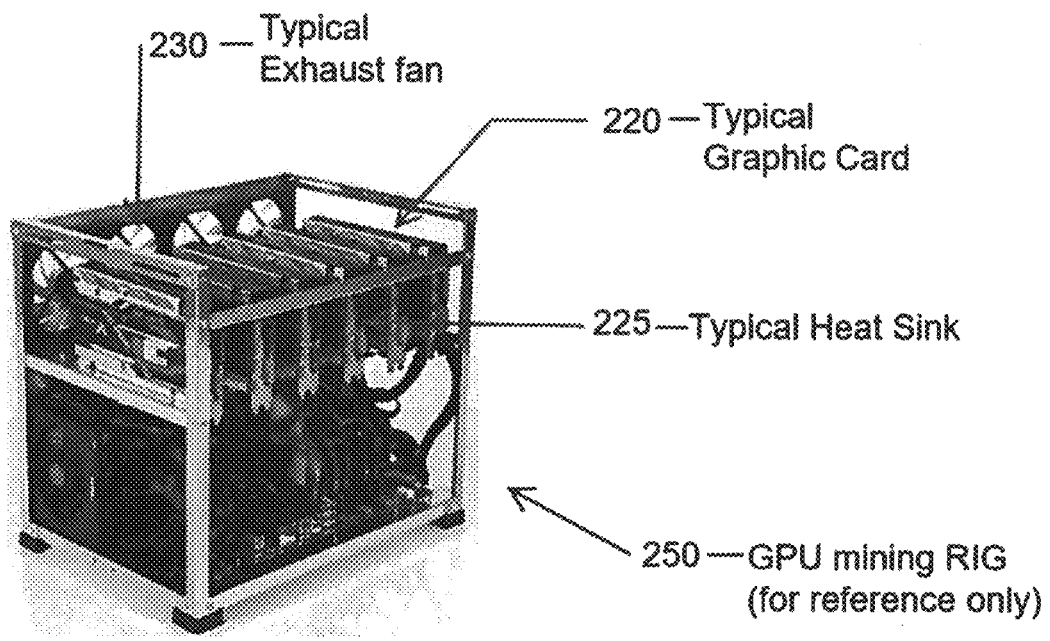
FIG. 1 is a schematic view of a typical Blockchain miner using ASIC technology in accordance with an exemplary embodiment.

The present subject-matter uses Blockchain mining in an improved manner to improve the well-being of people. To do so, Blockchain mining is used in an efficient way, comprising having the Blockchain being planned in an efficient and coherent way. It is expected that blockchain mining will be part of our lives perhaps forever. Accordingly, we have to be logical and practical in the planning of the mining farm location.

It is considered important to use the energy consumed by the Blockchain mining in a responsible and effective way. To achieve this, the electricity used for that purpose has inevitably to have no or a minimized impact on the existing electricity network. Decentralization is imperative as well as the recovery and transfer of this energy. This mining rejected heat is therefore to be recovered and to become an implement in the agriculture industry and moreover is to be used to produce fruits and vegetables.

Recovered heat is in consequence to be used to reduce the farmers' operating costs in a substantial way, thereby allowing farmers to reduce their sale prices resulting from the reduction of their expenses.

On the other hand, Blockchain mining companies are desperately seeking new locations to be able to install their mining equipment. The Blockchain mining population's perception is: noisy, pollutant, not job creators and request an enormous amount of electricity to run their equipment.

With the present heat recovering system, it will be possible or ideal to merge these two activities in a win-win situation. The heat recovering system is all about this.

It is further desirable to be able to produce fruits and vegetables all year around, and even in cold regions when heating is affordable, such as via the present subject-matter based on Blockchain mining. The implementation of the present solution will thus have a direct impact on the local economy. It will reduce, if not eliminate, the need to consume fruits and vegetables which have been cultivated thousands of kilometers away from the place of consumption and thus strongly decrease their transportation with refrigerated trucks.

The Blockchain mining can in consequence be synonymic of job creation in the more distant regions and be a factor in approaching and even achieving self-sufficiency.

Accordingly, the present subject-matter is designed to recover energy created by the heat rejection of a Blockchain mining process. The energy recovered is then transferred into a greenhouse or any other application in the Agri-Food industry. The expanded Agri-Food industry is broad and includes at least all of the different sectors listed below:

Fruit and vegetables (Greenhouse)
Flowers (Greenhouse)
*Cannabis*/marijuana (Greenhouse)
Plant and plant products (Greenhouse)
Pulses and special crops
Agriculture
Bakery products and pasta
Beverages
Dairy products
Poultry and poultry products
Meat and meat products
Livestock—general
Livestock—bovine
Livestock—sheep
Livestock—equine
Livestock—goat
Livestock—swine
Livestock—alternative
Fish and seafood
Organics
Honey, syrup
Oilseeds, cereals and grains
Pet food and animal feed The present subject-matter contributes in helping the above listed producers to substantially reduce their energy cost and consequently in being more efficient and profitable. At the end, producers and consumers will gain from the implementation of the present subject-matter.

Regarding availability, the present subject-matter includes the details to build and install a decentralized technical room, thereby providing an economical and available solution to all producers and give the opportunity to the Blockchain mining companies to install their equipment to the satisfaction of all population living with cold winter conditions.

This typically custom-made technical room is adapted to be installed as near as possible to the greenhouse or other installation. If required, the technical room can be rise-up structure supported on a steel structure.

As to integration, the subject-matter is designed to recover the heat rejection obtained from a Blockchain mining installation and to integrate this energy into the greenhouse process (e.g. heating, heat tracing and hot water networks).

On the dust and noise front, the custom-made technical room is built to ensure a quiet surrounding environment. Thermal insulation and acoustic soundproofing casing is used in the construction of the custom-made technical room. The casing is tight and sealed to avoid dust penetration inside the Blockchain mining room.

The present system is thus able to contribute in different way to a sustainable development by:
- Free Energy: energy dedicated to the Blockchain miners recovered will have a second life. The intent is to recover this energy and to transfer the same into a requested energy process in the Agri-food industry.
- Ground Transportation: with the system in place, a producer of fruit and vegetables will be able to operate 12 months/year with the savings on their energy costs. Therefore, the fruit and vegetables so produced will be available locally all year long. This will reduce long distance ground transportation via refrigerated trucks.

Blockchain mining decentralized: the implementation of the present subject-matter will have no major impact on the existing grid utilities. The present system load demand will be relatively low, and the net demand wig be negative with respect to overall outcome. Because the intent is to provide heating and hot water to a client (e.g. a producer), the present system is designed with the appropriate Blockchain mining power capacity to fit the energy demand (i.e. heating and hot water) of the client for a typical one-year period. The present built-in technical room will reach to those of the above-listed producers who are eager to reduce their energy costs.

Energy: the rejected heat will be transferred into the new or existing infrastructure. This can be achieved by different ways depending upon the existing infrastructure.
- a. Hot water produced by heating the water/refrigerant heat exchanger warm water with $CO_2$ heat pump.
- b. Warm water produced from an Air/Water heat exchanger.
- c. Warm water produced from heat rejected directly from the liquid cooled mining devices by using liquid cooled miner type.

Blockchain mining hardware: the present subject-matter is not limited to do mining only to cryptocurrency and has no limits on the type of hardware: for example ASIC and GPU.

Limited wasted energy: if a Blockchain mining is too powerful for the connected load based on the energy consumption on a one-year period then there will be a lot of heat rejection during hot summer days. This hypothetic situation cannot be considered to be sustainable development, and this is why the intent is to provide the required power to fit the load demand on a one-year operation period.

Origin of the subject-matter: considering the climate in the Province of Quebec (Canada) and its effect on greenhouses energy requirements, the issue was raised as to if it would be possible to operate a greenhouse for a longer period during the year without paying enormous energy cost.

It was then thought to do so by using heat rejected from a Blockchain mining installation as long as it would be sufficient to provide enough heating to such a greenhouse during the cold winter period.

The new world of cryptocurrencies was studied as well as the expectations within the power of Blockchain Technology. On the other hand, the agricultural greenhouses where fruits and vegetables are cultivated require a great deal of energy to operate. The temperature inside of a greenhouse must be maintained relatively high to be able to obtain a profitable production. This situation is similar for most North American farmers operating greenhouses.

The possibility of recuperating energy rejected by the Blockchain miners was evaluated. Factors were considered such as Hydro-Quebec's moratorium on projects of Cryptocurrencies and all technologies associated with the Blockchain for many reasons (e.g. high electricity power demand and heat rejection, pollution, noise, no job creators). The present subject-matter's principle to put the mining equipment in a technical room offers a decentralized solution that fulfills the requirements. In term of risk management, this is a worthwhile solution and provides an opportunity to recover the energy and redirect it into a greenhouse.

The technical room with Blockchain mining operation was considered with two objectives: doing Blockchain mining as a source of income, and considering the rejected heat similarly as an electric heating coil that operates 24/7 (thus generates heat 24 hours per day and 7 days per week).

Terminology: For the purpose of the understanding of the present subject-matter, words related to a Blockchain have to be clear, and thus a non-exhaustive lexicon follows hereinbelow.

a) Blockchain:

A Blockchain, originally block chain, is a continuously growing list of records (b), called blocks, which are linked and secured using cryptography (c). Each block typically contains a cryptographic hash (d) of the previous block, a timestamp and transaction data. By design, a Blockchain is inherently resistant to modification of the data. It is "an open, distributed ledger that can record transactions between two parties efficiently and in a verifiable and permanent way". For use as a distributed ledger, a Blockchain is typically managed by a peer-to-peer (e) network collectively adhering to a protocol for inter-node communication and validating new blocks. Once recorded, the data in any given block cannot be altered retroactively without the alteration of all subsequent blocks, which requires collusion of the network majority.

Blockchains are secure by design and exemplify a distributed computing system with high Byzantine fault tolerance. Decentralized consensus has therefore been achieved with a Blockchain. This makes Blockchains potentially suitable for the recording of events, medical records, and other records management activities, such as identity management, transaction processing, documenting provenance, food traceability or voting.

Blockchain was invented by Satoshi Nakamoto in 2008 for use in the cryptocurrency (f), bitcoin (g), as its public transaction ledger. The invention of the Blockchain for bitcoin made it the first digital currency to solve the double-spending problem without the need of a trusted authority or central server. The bitcoin design has been the inspiration for other applications.

(*) See below references b) c) d) d) e) f) g)

b) Records:
   In computer science, a record (also called a structure, struct, or compound data) is a basic data structure.
c) Cryptography:
   Modern cryptography is heavily based on mathematical theory and computer science practice; cryptographic algorithms are designed around computational hardness assumptions, making such algorithms hard to break in practice by any adversary. It is theoretically possible to break such a system, but it is infeasible to do so by any known practical means. These schemes are therefore termed computationally secure; theoretical advances, e.g., improvements in integer factorization algorithms, and faster computing technology require these solutions to be continually adapted. There exist information-theoretically secure schemes that probably cannot be broken even with unlimited computing power—an example is the one-time pad—but these schemes are more difficult to implement than the best theoretically breakable but computationally secure mechanisms.
d) Cryptographic Hash:
   A cryptographic hash function is a special class of hash functions that has certain properties which make it suitable for use in cryptography. It is a mathematical algorithm that maps data of arbitrary size to a bit string of a fixed size (a hash) and is designed to be a one-way function, that is, a function which is infeasible to invert. The only way to recreate the input data from an ideal cryptographic hash function's output is to attempt a brute-force search of possible inputs to see if they produce a match, or use a rainbow table of matched hashes. Bruce Schneier has called one-way hash functions "the workhorses of modern cryptography". The input data is often called the message, and the output (the hash value or hash) is often called the message digest or simply the digest.
   The ideal cryptographic hash function has five main properties:
      it is deterministic so the same message always results in the same hash;
      the hash value is quick to compute for any given message;
      it is infeasible to generate a message from its hash value except by trying all possible messages;
      a small change to a message should change the hash value so extensively that the new hash value appears uncorrelated with the old hash value; and
      it is infeasible to find two different messages with the same hash value.
   Cryptographic hash functions have many information-security applications, notably in digital signatures, message authentication codes (MACs), and other forms of authentication. They can also be used as ordinary hash functions, to index data in hash tables, for fingerprinting, to detect duplicate data or uniquely identify files, and as checksums to detect accidental data corruption. Indeed, in information-security contexts, cryptographic hash values are sometimes called (digital) fingerprints, checksums, or just hash values, even though all these terms stand for more general functions with rather different properties and purposes.
e) Peer-to-Peer:
   A peer-to-peer (P2P) network in which interconnected nodes ("peers") share resources amongst each other without the use of a centralized administrative system. The nodes therefore register in, or connect to, the peer-to-peer network in order to operate according to pear-to-peer operating protocols, or peer-to-peer protocols, with the operation resulting for instance from the miner collecting from the network information on processing requirements and autonomously performing operations, aka hashcash proof-of-work function, based on the collected data in order to obtain a result, including a proof-of-work block or proof of work.
f) Cryptocurrency:
   According to Jan Lansky, a cryptocurrency is a system that meets six conditions:
      The system does not require a central authority, distributed achieve consensus on its state [sic].
      The system keeps an overview of cryptocurrency units and their ownership.
      The system defines whether new cryptocurrency units can be created. If new cryptocurrency units can be created, the system defines the circumstances of their origin and how to determine the ownership of these new units.
      Ownership of cryptocurrency units can be proved exclusively cryptographically.
      The system allows transactions to be performed in which ownership of the cryptographic units is changed. A transaction statement can only be issued by an entity proving the current ownership of these units.
      If two different instructions for changing the ownership of the same cryptographic units are simultaneously entered, the system performs at most one of them.
   In March 2018, the word "cryptocurrency" was added to the Merriam-Webster Dictionary.
g) Bitcoin:
   Bitcoin (B) is a cryptocurrency and worldwide payment system. It is the first decentralized digital currency, as the system works without a central bank or single administrator. The network is peer-to-peer and transactions take place between users directly, without an intermediary. These transactions are verified by network nodes through the use of cryptography and recorded in a public distributed ledger called a Blockchain. Bitcoin was invented by an unknown person or group of people under the name Satoshi Nakamoto and released as open-source software in 2009.
   Bitcoins are created as a reward for a process known as mining. They can be exchanged for other currencies, products, and services. As of February 2015, over 100,000 merchants and vendors accepted bitcoin as payment. Research produced by the University of Cambridge estimates that in 2017, there were 2.9 to 5.8 million unique users using a cryptocurrency wallet, most of them using bitcoin.
h) Cryptocurrency Miners:
   In cryptocurrency, a miner, e.g. a blockchain mining device, is a computer or group of computers 'searching' for cryptocurrency. They constantly verify transactions and as an incentive they get rewarded with cryptocurrency. In the present context, cryptocurrency miner, Blockchain miner and miner all refer to the same apparatus. One should note that miners, when compared to web servers, search servers, and database servers, presents physical differences that are essential for the operation and in the communication requirements and energy consumption. Miners do not involve large data storage, but rather present minor or no storage requirements but rather large mathematical processing requirements. Power interruptions are not critical for miners; the miners who interrupted processes following power interruption do simply start a new mining process or resume the process, with the interruption not affecting other processes. Further, since the communications are limited to peer-to-peer protocol exchange data with no or minimal data storage, the communication requirements are very low, and thus the ratio of processing versus communications are extremely high. See https://en.wikipedia.org/wiki/Bitcoin and http://www.google.com/about/datacenters/inside/integrated by references to see a list of differences between the miners and the datacenter servers. Operation made from a miner;

i) Hashcoin Mining:

In cryptocurrency networks, mining is a validation of transactions. For this effort, successful miners obtain new cryptocurrency as a reward. The reward decreases transaction fees by creating a complementary incentive to contribute to the processing power of the network. The rate of generating hashes, which validate any transaction, has been increased by the use of specialized machines such as FPGAs and ASICs running complex hashing algorithms like SHA-256 and Scrypt.

This arms race for cheaper-yet-efficient machines has been on since the day the first cryptocurrency, bitcoin, was introduced in 2009. With more people venturing into the world of virtual currency, generating hashes for this validation has become far more complex over the years, with miners having to invest large sums of money on employing multiple high performance ASICs. Thus, the value of the currency obtained for finding a hash often does not justify the amount of money spent on setting up the machines, the cooling facilities to overcome the enormous amount of heat they produce, and the electricity required to run them.

Some miners pool resources, sharing their processing power over a network to split the reward equally, according to the amount of work they contributed to the probability of finding a block. A "share" is awarded to members of the mining pool who present a valid partial proof-of-work.

Given the economic and environmental concerns associated with mining, various "minerless" cryptocurrencies are undergoing active development. Unlike conventional Blockchains, some directed acyclic graph cryptocurrencies utilise a pay-it-forward system, whereby each account performs minimally heavy computations on two previous transactions to verify. Other cryptocurrencies like Nano utilise a block-lattice structure whereby each individual account has its own Blockchain. With each account controlling its own transactions, no traditional proof-of-work mining is required, allowing for feeless, instantaneous transactions.

As of February 2018, the Chinese Government halted trading of virtual currency, banned initial coin offerings and shut down mining. Some Chinese miners have since relocated to Canada. According to a February 2018 report from Fortune, Iceland has become a haven for cryptocurrency miners in part because of its cheap electricity and cold weather. Prices are contained because nearly all of the country's energy comes from renewable sources, prompting more mining companies to consider opening operations in Iceland. However, the cryptocurrency mania might have gone a little too far in Iceland. The region's energy company says bitcoin mining is becoming so popular that the country will likely use more electricity to mine coins than power homes in 2018.

In March 2018, a town in Upstate New York put an 18 month moratorium on all cryptocurrency mining in an effort to preserve natural resources and the "character and direction" of the city.

For comparison, and to understand the presence of differences in structures and processes between the two, hereinafter is explained what is a data center.

Data centers are facilities that store and distribute the data on the Internet. With an estimated 100 billion plus web pages on over 100 million websites, data centers contain a lot of data. With almost two billion users accessing a these websites, including a growing amount of high bandwidth video, it's easy to understand but hard to comprehend how much data is being uploaded and downloaded every second on the Internet.

A data center, as defined in TIA-942, Telecommunications Infrastructure Standard for Data Centers, is a building or portion of a building whose primary function is to house a computer room and its support areas. That definition seems quaint in the era of giant warehouse-sized data centers with hundreds of thousands of servers, switches and storage and up to a million interconnections.

The main functions of a data center are to centralize and consolidate information technology (IT) resources, house network operations, facilitate e-business and to provide uninterrupted service to mission-critical data processing operations. Yes, it is what we used to call the computer room before it grew to fill giant buildings! Data centers can be part of an enterprise network, a commercial venture that offers to host services for others or a co-location facility where users can place their own equipment and connect to the service providers over the building's connections.

Data centers can be big like a Google, Facebook, Amazon or Apple data center. Probably nobody has data centers bigger than Google. (OK, maybe NSA.) Google has has some very artistic photos taken of their data centers and put them online so al can see them. Additional information about Google's data centers can be found at http://www.google.com/about/datacenters/inside/.

The main functions of a data center are to centralize and consolidate information technology (IT) resources, house network operations, facilitate e-business and to provide uninterrupted service to mission-critical data processing operations.

Data centers can be part of an enterprise network, a commercial venture that offers to host services for others or a co-location facility where users can place their own equipment and connect to the service providers over the building's connections.

Data centers are filled with tall racks of electronics surrounded by cable racks, power cables and cooing equipment. Data is typically stored on big, fast hard drives although there is some movement to solid state drives. Servers are computers that take requests and move the data using fast switches to access the right hard drives. Routers connect the servers to the Internet. Speed is of the essence. Servers are very fast computers optimized for finding and moving data. Likewise, the hard drives, switches and routers are chosen for speed. Interconnection use the fastest methods possible. Faster speed means lower latency, the time it takes to find and send the data along to the requester.

Additional information is also available here: https://www.coindesk.com/information/what-is-the-di(ference-bockchain-and-database.

Subject-matter—recovering and transferring the rejected heat: Blockchain mining installations release a great amount of heat. In fact, it is considered that practically ±96% to ±100% of the electrical power powering the miners are afterwards released as heat. This heat is rejected through the heat sinks that are directly bounded to microprocessors, which are performing Blockchain calculations. Another type of miner rejects its heat through a liquid cooled system. The principle is the same, but instead of having the microprocessor connected to a heat sink, the microprocessor is connected to a cooled liquid piping network.

In known mining installations, the heat released by the miners is rejected to the outside or to air cooling units is used to maintain an appropriate temperature inside the technical rooms of such installations. In these installations, the only consideration is to collect the crypto income, and any broader energy consideration is simply discarded. In the present subject-matter, electricity from clean energy sources is considered one of the most efficient and clean energy available on earth and this clean energy needs to be used properly, whereby available energy should be recovered, when possible and justifiable. In term of sustainable development, this means that as much heat as possible should be recovered and this recovered energy should be treated as a "great energy opportunity".

Because the above is to be considered as a source of heat, the present subject-matter is designed to maximize the use of this energy. There is a challenge in managing this relative hot air energy in a one-year cycle that includes various weather conditions encountered during this period.

There follow hereinafter the present subject-matter principles which will be applied and realized with the heat recovery dissipated by the Blockchain miners in the following sectors:

Agri-food industry (preferred application):
Contribute or totally heat a greenhouse or any Agri-food industry by using the heat discharged from the Blockchain miners.
Contribute or totally warm-up the greenhouse or any Agri-food industry process water with a heat exchanger.

Principle of functioning (air-cooled miner type): The energy rejected by the Blockchain miners 200 comes from the heat rejected through the fan 210 (see FIG. 1: Typical Blockchain miner illustration using ASIC technology).

Figure 2:
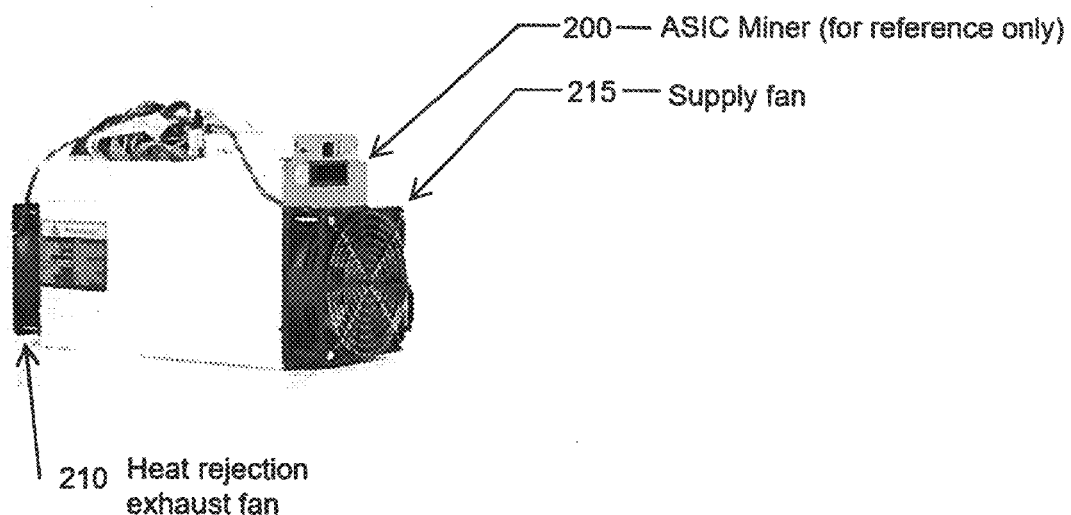
FIG. 2 is a schematic view of an air-cooled GPU mining RIG in accordance with an exemplary embodiment.

Also, Blockchain mining can be achieved with another type of equipment. FIG. 2 shows an air-cooled GPU mining RIG 250. Like the ASIC technology, the GPU mining RIG 250 rejected the heat of the graphic cards 220 through the heat sinks 225 with a mounted exhaust fan 230.

Heat production: When the Blockchain miners 200 are in operation, the heat produced by each micro-processor of each graphics cards 220 or by each micro-processor while performing very large-scale calculations (algorithm or script) becomes really hot. The heat is then transferred to the heat sink 225 bounded to each microprocessor. More complex the hashing algorithm calculations (in quantity and difficulties) the micro-processors are running, harder the microprocessors will work. The heat dissipated from the heat sink 225 will rise in proportion. Every component in a Blockchain mining system has its own exhaust fan 216 located in the back of the component. The purpose of the supply fan 216 is to ensure that the temperature inside the component will not reach a level at which the component may overheat. This implies that the temperature in the front of the component needs to be relatively colder than at the output.

Here are ventilation criteria for miners hardware equipment.
i. In order to ensure the optimal operation conditions of each miner 200/GPU mining RIG 250, there are two concerns:
  a. maintain as much as possible the supply air temperature between 15° C. and 35° C./59° F. and 95° F.;
  b. maintain a high quality of supply air (i.e. dust free, since dust is detrimental).
ii. Remove the heat dissipated from the mining 200/GPU mining RIG 250 as quickly as possible.
iii. Maintain clean supplied air to the miners 200/GPU mining RIG 250.
iv. The miners 200 and/or the GPU mining RIG 250 must be very well ventilated with an appropriate and uniform air flow (temperature & CFM).

Energy Recovering Technical Room:
a) The present design uses the heat created from the Blockchain mining equipment installed in a custom-made technical room and recover all possible energy and transfer this energy into a "greenhouse" or any other Agri-Food industry application.
b) The technical room is custom-made built for installation on a concrete pad.
c) For acoustic concerns, the energy recovering technical room comprises thermal insulation and soundproofing to preferably eliminate any sound created by the miner fan's 210, 215, 230 and by the ventilation system. One typical ASIC miner 200 have a noise level of 70 to 75 dBA.
d) Ventilation system description:
  i. the present system is based on two parameters. The first is to provide appropriate ventilation to the miners 200 in order to maintain the appropriate supply temperature. The second is to recover and distribute all the energy rejected in the form of heat from the miners 200.
  ii. there are many ways to remove and transfer heat from the technical room to a "greenhouse" or any other Agri-Food industry application, e.g.:
    1. by using air displacement combined with an air/water heat exchanger:
      a. the miner rejected heat is forced to circulate into an air/water heat exchanger:
      b. this rejected heat energy is recovered to reheat cold water with a heat exchanger water/water.
    2. by using a thermodynamic cycle ($CO_2$ water to water heat pump) combined with the above:
      a. by making full use of the advanced refrigeration technology. The rejected heat energy is captured and transferred to the greenhouse or any other Agri-Food industry application by enhancing the air/water heat exchanger water temperatures before transferring into the greenhouse systems;
      b. the present system uses $CO_2$ refrigerant gas. This environmental refrigerant gas absorbs and transfers the heat energy through the refrigeration circulation system. One water/refrigerant heat exchanger acts as a heat collector (evaporator) and the other acts as a heat discharger (condenser). The liquid refrigerant in the water/refrigerant heat exchanger evaporator absorbs the available heat in the water transforming it into a gas. The refrigerant gas is then pumped by the heat pump compressor. When this warmed gas is compressed, it intensifies or concentrates the heat. This intensely hot gas is then pumped into the water/refrigerant heat exchanger condenser where the actual heat exchange takes place.

Figure 3:
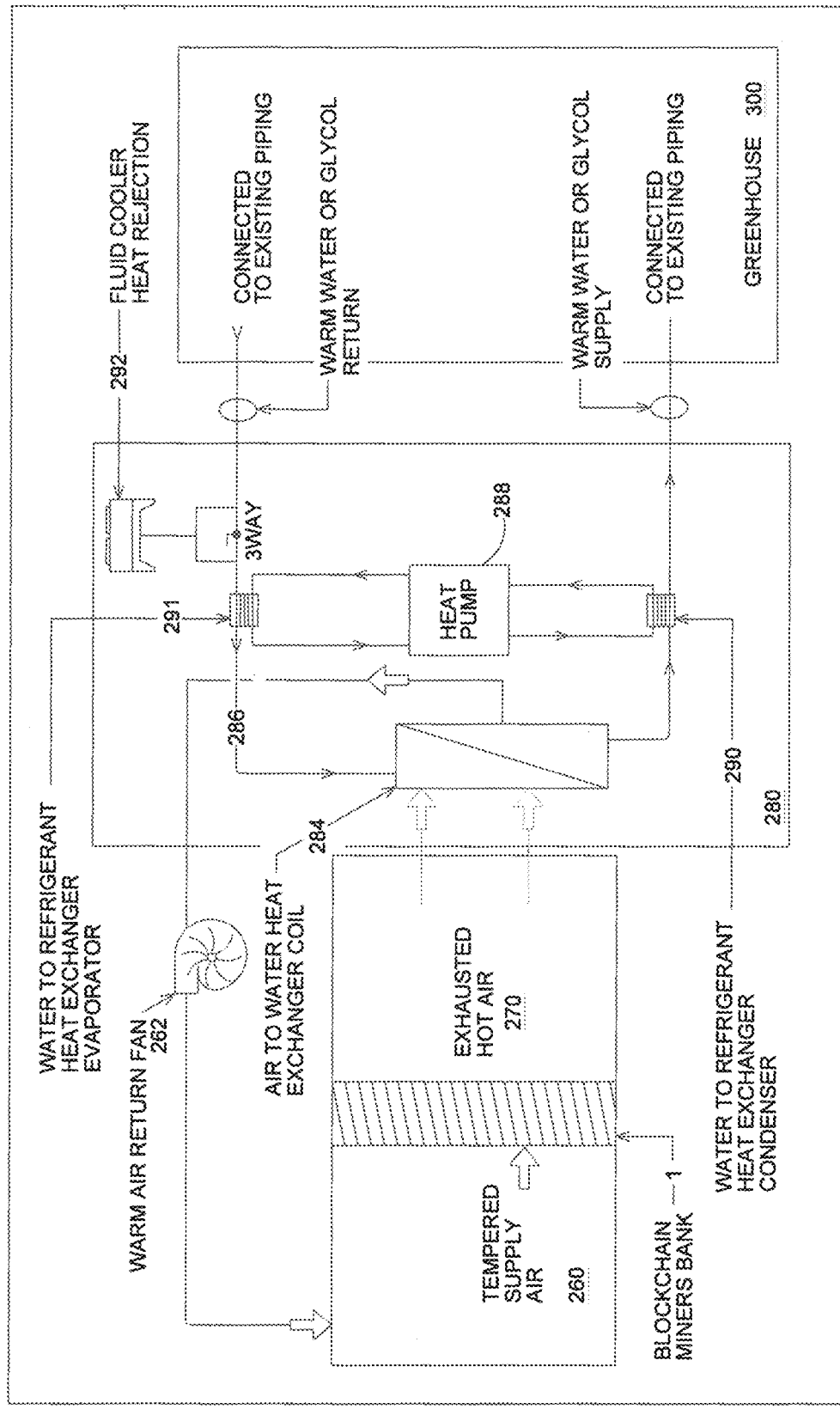
FIG. 3 is a block diagram of an exemplary realization comprising a series of Blockchain miners a in accordance with an exemplary embodiment.

Principle of Functioning:

Reference is now made to the block diagram of FIG. 3 to understand the functioning of the system.

First Block—Tempered Supply Air 260:

Objective: provide tempered supply air to the miners 200 and/or 260. The Blockchain miners bank 1 is composed of a multitude of miners 200 and/or 250 in quantity to provide the appropriate heating power source by considering the heat capacity produced in Watt of each miner. The tempered air in this area is in 100% recycling mode. The objective is to move the air constantly in order to remove the heat from the miners 200 and/or 250. The supply air is distributed uniformly to al miners 200 and/or 260.

Second Block—Hot Air Exhausted 270:

Objective: remove efficiently the heat rejected by the miners 200 and/or 250 with the warm air return fan 262.

Third Block—Managing the Energy 280:

All the air forced through the Blockchain miners bank 1 is constantly recycled and directed to circulated in the air/water heat exchanger 284. The water circulating into the air/water exchanger 284 removes the collected energy and directed it into the greenhouse heating systems via a water-loop network. When required, the supply water temperature is enhanced from the heat pump 288 by injecting heat into the water/refrigerant heat exchanger condenser 290. At the same time, the water/refrigerant heat exchanger evaporator 291 will reduce the water temperature of the coils supplying water 286. It's a win-win situation. While the greenhouse 300 is heated, the miners room air temperature is cooled. With the CO2, the temperature of the water or glycol/water will rise up substantially depending to the size of the heat pump 288, for instance it can reach up to 180° F. During the warm seasons, when the heating capacity is too large for the greenhouse needs, the water loop is deviated through the fluid cooler 292 before returning to the air/water coil heat exchanger 284.

Fourth Block—Greenhouse 300 or any Other Agri-Food Industry Application:

The energy recovered in the technical room (encompassing blocks 260, 270 and 280) will be introduced and integrated into the process of the greenhouse 300 for heating and hot water needs.

The hot water is connected to the hot water network directly or through a plate heat exchanger (not shown).

The warm water is connected into the greenhouse heating system through a fan coil (not shown). Depending on the exterior conditions and the type of greenhouse 300, the energy supplied into the greenhouse 300 will be used to heat the entire greenhouse 300. This will depend upon the size and the capacity (kW) of the chosen Blockchain miners bank 1.

With the present modular system, a larger greenhouse 300 may need more technical rooms to fit the energy load of the greenhouse 300. Then two, three technical rooms (or more) can be put in place to meet the load demand.

The greenhouse 300 receives warm water from the system. This warm water is connected to any equipment or network, e.g.:
  i. fan coil;
  ii. thermal storage tank;
  iii. to preheat cold water (from the utilities or the well);
  iv. into radiant heating system for crops tables;
  v. greenhouse watering system;
  vi. etc.

Inside the greenhouse 300, energy is managed according to the needs. The greenhouse control panel (not shown) will manage the supplied energy through their existing or new heating system to control all listed above equipment according to the exterior conditions (T").

Hot water production is required all year long in a greenhouse 300 and the proposed system is designed to meet this demand. If there is only a fraction of the energy that is required by the greenhouse 300, then the remainder of the energy will be rejected through the fluid cooler 292.

Referring now to FIGS. 4 to 9 in relation with an alternative embodiment.

Heating load demand—Greenhouse located near Montreal, Québec

In order to design, built and install nearby to a Greenhouse a sustainable development-oriented heat recovering system, the first step is to evaluate the right capacity of heating required to the greenhouse.

To do so, an energy simulation study must be made with precision. The type of Greenhouse covering material, the location, the type of culture, the monthly period of culture, etc. wig need to be taken into account within the energy simulation.

Once the energy simulation is done, the requested supply heating capacity will be drawn on a one-year period graphic. For this purpose, we have used the graphic heating load of a typical Greenhouse located near Montréal, Québec, Canada.

Figure 4:
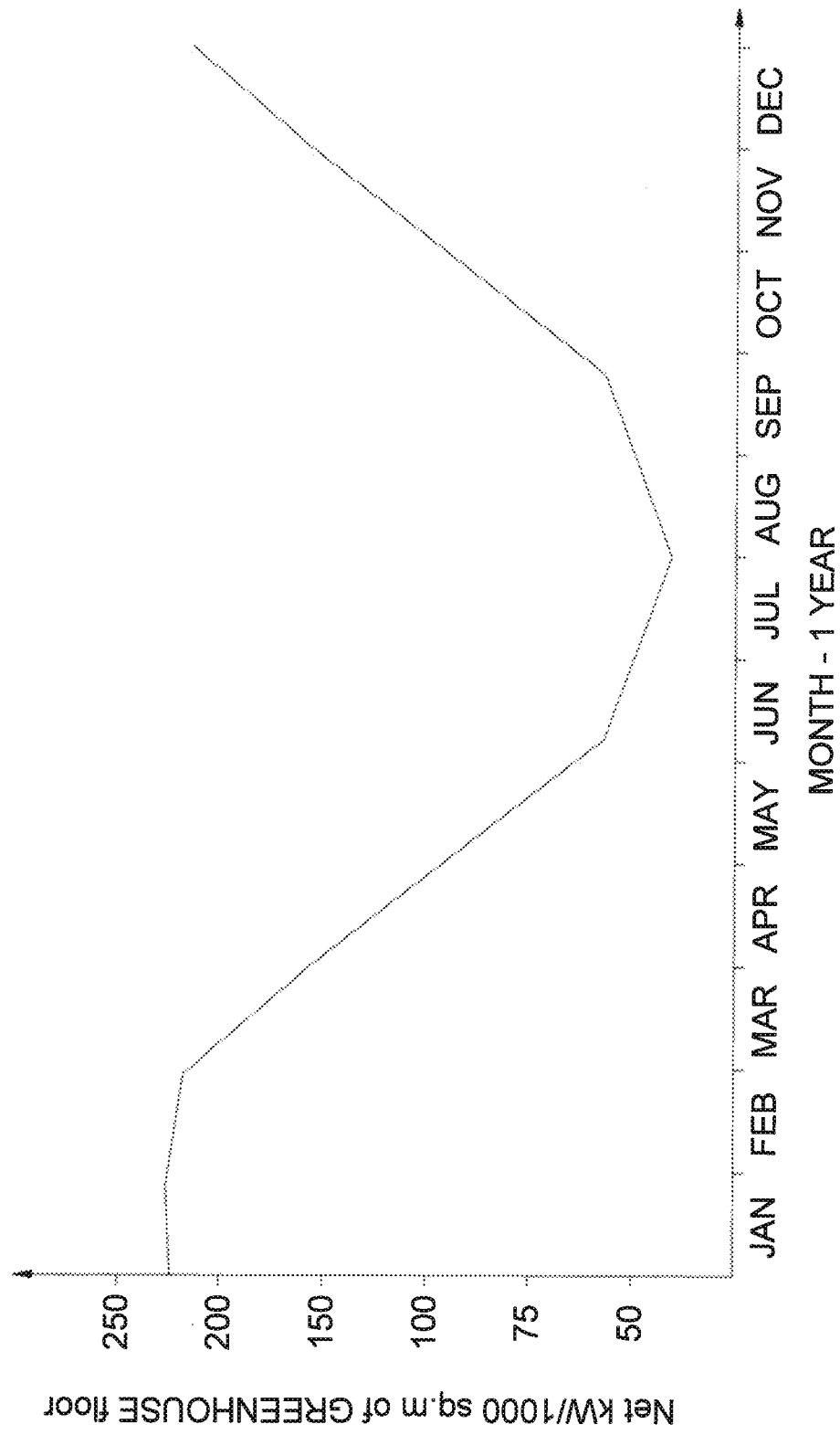
FIG. 4 is a graph providing simulation of a heating power demands of a greenhouse in an exemplary location such as Montreal, Quebec, Canada.

The FIG. 4 represents the average monthly heating load for a Greenhouse maintain at 18° C./64.4° F. during the cold season. For this example, the Greenhouse average heating load is ±225 kW/1000 m2 during January, February and December. Then the heating load is contentiously diminishing until the end of July to rise progressively until December. (Based on temperature statistics for the area from 1982 to 2012)

According to FIG. 4, the greenhouse heating load is constantly changing throughout the year. Then, considering a sustainable development-oriented system, the heat recovering system needs to provide a modulating heating source that will match the greenhouse heating load pattern.

Knowing that the heating source provide by the miners is stable and fixes, the challenge is to add another type of heat recovering system that will provide the modulating heat source. This is the main subject of the present document.

Figure 5:
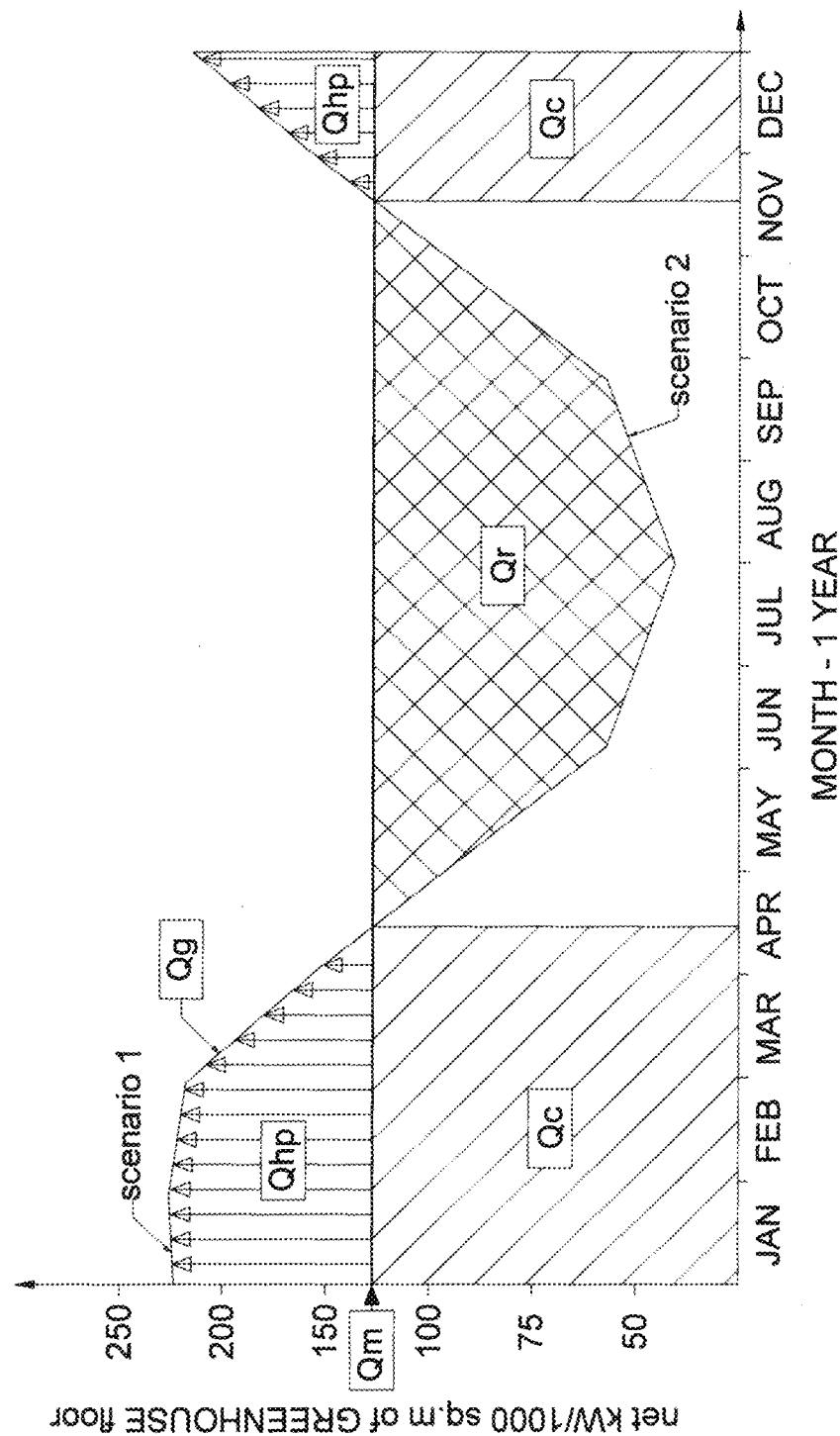
FIG. 5 is a graph illustrating participation of an exemplary scenario in the response to poser demand, and more specifically to heat demand of a greenhouse located in Montreal, Quebec, Canada.

Refer now to FIG. 5. On a large-scale view, the functioning of the heat recovering system. From the greenhouse load patterns show on FIG. 4:

System Functioning Philosophy:

The system uses 2 types of energy recovering systems:
  1) Energy recovering coil (air/water);
  2) Water to water heat pump using CO2 as refrigerant.

Wherein the energy recovering coils provides a fixed energy obtain through the miners heat dissipation and wherein the water to water CO2 heat pump provides a modulating energy through the water network.

Considering the greenhouse load pattern which required a modulating heat source, this aspect is addressed by using a fixed and a modulating energy source graphically represented as (and identified in FIG. 5):

$Qm$=Blockchain Miners Bank capacity in kW;
  $Qc$=Heat capacity recovered by the Coil in kW;
  $Qhp$=Heat pump Heat capacity injected in the system in kW;
  $Qg$=Greenhouse heating load capacity in kW obtain from the Energy simulation study;

Qr=Rejected heat capacity kW (water tower or similar heat rejection equipment).

Summary of Functioning

During the cold season, the full capacity of (Qg) is obtained by the addition of (Qc) and (Qhp).

(Qc) is the heating capacity recovered by the heat recovering coils which represents a 1:1 ratio of the blockchain miner capacity (Qm).

In order to obtain the right capacity requested from (Qg), the heat pump is used to add (Qhp) enough heating capacity to equal (Qg).

The combination of these two devices used at the same time allows to downsize the heat pump capacity equivalent to the heating capacity recovered by (Qc). This implies important saving on electricity consumption. In this situation, the heat pump is used only during the coldest season period and operates according the (Qg) heating pattern curves.

The higher the capacity of the heat pump, broader will be the available range of modulation. On the graphic represented by FIG. 5, the heat pump capacity is sized to be used 5 months per year which represented about ±40% of the greenhouse heat load (Qg).

During the hot period, the heating demand for (Qg) is very low compared to (Qm). In this condition, the overheat recovered by (Qc) is either managed into the greenhouse if needed or rejected outside through the heat rejection device (Qr). According to an alternative realization, a portion of the heat can be stored in the form of for example hot water to face short-term demand or can be transformed into another form (e.g. electricity) to be stored to face longer-term demands.

Decentralized Location

Unlike using heat discharges from a data center where the greenhouse needs to be installed just beside it, this decentralized system is installed wherever the need of an important heating load demand is requested.

The heat recovering system needs to be installed nearby any (existing or new) agri-food industries requiring heating throughout the year.

The site needs to be served by a grid utility company able to provide the appropriate electrical power capacity.

The site needs to be served by a communication company providing communication facility necessary to the mining process, for example optic fiber connection to the heat recovering system.

Figure 6:
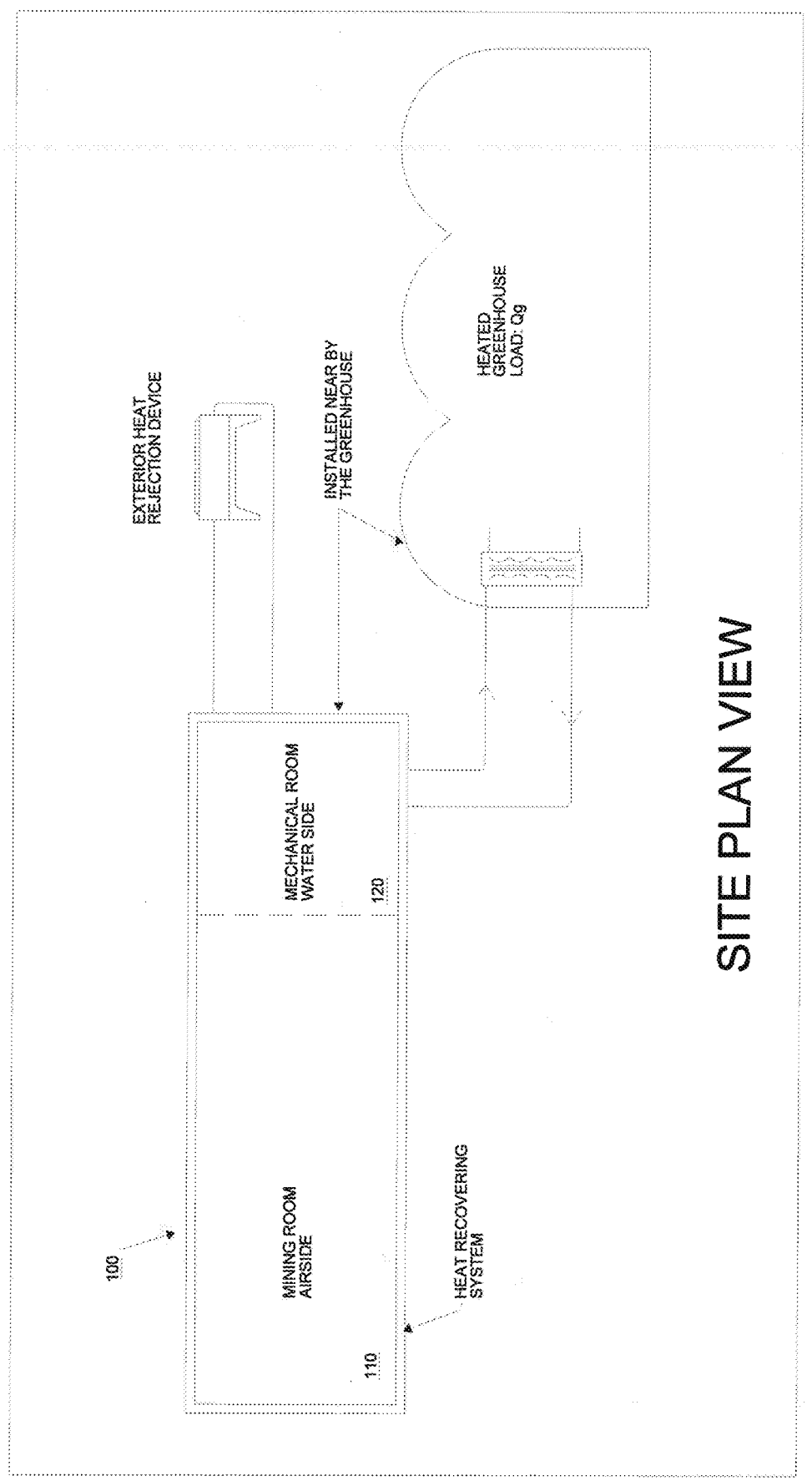
FIG. 6 is a schematic of a site comprising a greenhouse and an exemplary realization.

Referring now to FIG. 6—Decentralized Location.

The technical room 100 is done with two different rooms. There is the mining room 110 which is the complete with all the miners, the recovering coils and the ventilation system (not shown). The second is the mechanical room 120 which is completed with all the equipment required to manage and transport the recovered heat to the greenhouse. This mechanical room 120 contains all the piping's, heat pump, heat exchanger, in-line pump and controls panel (not shown).

Figure 7:
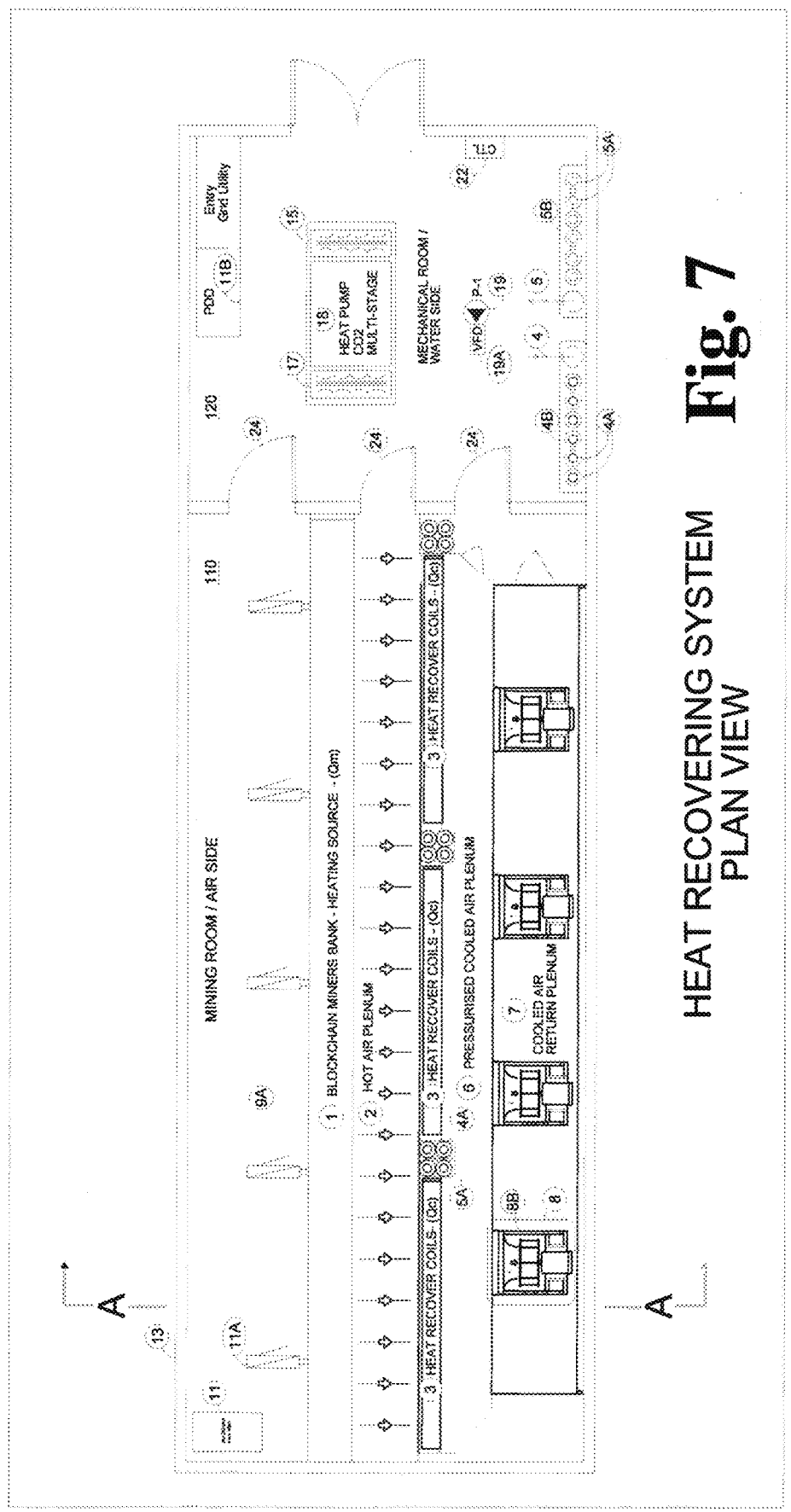
FIG. 7 is a plan view of a heat recovery system in accordance with an embodiment.

Referring now additionally to FIG. 7 to understand the system functioning principle.

The recovering system is composed of two main rooms
a. Mining Room 110/Airside;
b. Mechanical room 120/water side;

To limits any dust or other contaminant into each miner within the Blockchain miners bank 1, there is no ventilation connections between these two zones 110, 120. The separating wall and doors (24) are sealed. The combination of these components, with potential additional components, defines a dust control system ensuring a dust-free airflow to circulate in the system. Each of them has their own separated ventilation system;

Mainly the mining room 110 contains:
c. (1) Blockchain miners bank capacity (kW)—Heating capacity (Qm).
d. (2), the miners rejected hot air flow plenum.
e. (3), the air to water heat recovering coils (Qc) and interconnection piping (4A) & (5A).
f. (6), pressurized cooled air plenum.
g. (7) Return plenum
h. (8) Centrifugal plenum fans
i. (11) one typical dry type transformer
j. (11A) electrical panel The heating production capacity of the mining room 110 is expandable. To get a larger heating recovering system (more kW of heating), the length of the mining room 110 will get longer according to the requested heating capacity.

Because the system is modular, the heating capacity gets higher with an increase in the number of installed miners 200 and/or 250. The recovering coils (3) will also be longer in order to match the same length and recovering capacity of the Blockchain miners bank 1.

Because of the modularity of the mining room 110, the dimensions of the section A-A remain constant regardless of the desired capacity, thus regardless of the capacity being substantially increased.

Referring now additionally to FIG. 8: Mining Room—A-A Section

The miners 200 and/or 250 are mounted uniformly as a Blockchain miners bank (1) on racking, aka a mounting component, in order to be adequately ventilated. The miners heat rejection is equivalent to 96%-100% of their consumed power. (Qm) is the total rejected heat within the Blockchain miners bank (1). Typically, the miners 200 or 250 are mounted on the racking parallel to each other with the airflow to cool down the miners 200 or 250 configured to pass between the miners 200 or 260. This Miners Room encounters these characteristics:
a. The mining room 110 is well ventilated and operates continually in a 100% recycling mode;
b. The temperature at (9A) is maintained within the range of the miner's manufacturer's specifications;
c. The walls (13) and the roof (13A) are thermally insulated and acoustically soundproofed in respect to the nearby environment.
d. The construction is a "Bunker type" for security purpose;
e. To avoid dust coming from the exterior, there is no exterior air connections;
f. A dust-free environment provides an expend life cycle to miners 200 and/or 250 and reduce heat spots on their heating;
g. The relative humidity is controlled within the miner room 110;
h. The pressurized section (6) created by the centrifugal plenum fan (8) force the air flow through each miner 200 and/or 250 in a laminated way realized by the recovering coils air flow patterns;
i. To ensure a good airflow through each miner 200 and/or 250, all interior room corners are curved with turning vanes (10);
j. (11) Dry-type transformers are installed within the mining room 110 in order to recover their heat loss.

Airflow Functioning (Based on FIGS. 7 and 8):

The heat (Qm) dissipated from the miners bank (1) is moved in the miners rejected hot air airflow plenum (2) and into the heat recovering coil (3) by the airflow provided by the ventilation system (8). The ventilation system (8) is a centrifugal plenum fan that creates a pressurized plenum in the cooled air area (6). This pressurized plenum (6) impacts the airflow circulating through the energy recovery coils (3) uniformly and creating a laminated airflow through each miner 200 and/or 260.

When the hot air is crossing the heat recovering coils (3), the air temperature drops proportionally to the temperatures and flow of the water circulating inside the coils.

Once the air cooled, the air (6) is pulled by the centrifugal plenum fan (8), air is projected upwards by the Up-blast impellers (88) to be returned to the recirculation plenum (9) and (9A) and so on.

The top cover (12) seals the top of each zone (1) (2) (3) and (6) in order to avoid air lost.

The temperature inside the mining room 110 is constantly supervised and controlled in order to optimize the greatest heat transfer of the energy recovery coils (3) and to maintain the supply air temperature of the mining room/air side (9A) within the range of the recommended manufacturer's operating temperatures.

Temperature within the mining room 110 are continually monitored through area temperature probes (22F) in area (A), area temperature probes (22G) in area (2) and area temperature probes (22H) in area (8). The information is transferred to the control panel (22). Upon the seasons and conditions, the water flow within the network can be modulated with a variable frequency drive (19A) and this will impact the water temperature circulating inside the energy recovery coils (3).

The mechanical room contains all elements related to the piping network required to move the water, which contains the recovered heating load (Qc) into the greenhouse. The mechanical room is composed by:
a. (4) Main return water network piping;
b. (4A) Coil's section interconnection return piping;
c. (4B) Return water header
d. (5) Main supply water network piping;
e. (5A) Coll's section interconnection supply piping;
f. (5B) Supply water header
g. (11B) Main electrical switchboard c/w distribution panel and grid utility metering devices;
h. (15) Supply water to refrigerant heat exchangers where (Qhp) is injected in the network;
i. (17) Return water to refrigerant heat exchangers where (−Qhp) is injected in the network;
j. (18) Multistage $CO_2$ water to water heat pump;
k. (19) Inline pump station;
l. (19A) Variable frequency drive controlling the water flow;
m. (22) Control panel—managing all relevant temperature within the system; and
n. (24) Compartmental sealed doors.

In order to understand the roles of each above listed components, please refer to the functional diagram principle.

Now referring additionally to FIG. 9.

Scenario 1—Cold Season

Once the mining room is operational, and the air flows through the heat recovering cols (3). This recovered heat (Qc) is then transferred in the piping water network fed from the inline pumping station (19). The system water flow rate is controlled through a variable frequency drive (19A) offering the possibility to modulate the network water flow temperature circulating within the energy recovery coils (3) in the mining room 110.

Consequently, the inlet water (4) circulating into the energy recovery coils (3) rise in proportion of the recovered energy contains in (Qc). This energy (Qc) then flows into the main piping supply (5). The water temperature is measured at the water supply temperature probe (22A) and the value is recorded at the mechanical room control panel (22).

This energy (Qc) moves through the water/refrigerant heat exchanger (16). When the greenhouse heating load demand (Qg) is higher than (Qc), the heat pump (18) is used to provide the lacking energy of (Qc) in order to satisfy the requested heating load (Qg).

When the $CO_2$ multi-stage heat pump (18) adds energy (Qhp) in the water/refrigerant heat exchanger (15) acting as a condenser relevant of the thermodynamic cycle principle of the $CO_2$ multi-stage heat pump (18), the temperature from the cooled water pipe (4D) and the main return water pipe (4) dropped within the water/refrigerant heat exchanger (17) acting as the evaporator, in proportion of the injected energy (−Qhp) obtain by heat pump thermodynamic cycle.

The water energy contains at the heat exchanger output supply water piping (5C) is the sum of (Qc) and (Qhp);

During the cold season, when the heat pump (18) is used to inject heating capacity in the network, the exterior heat rejection device (20) is not in use.

The water temperature is measured at the water supply temperature probe (22B) before the connecting point to the greenhouse and the value is recorded at the mechanical room control panel (22).

The heating energy of the greenhouse heat exchanger supply piping (5D) is then applied at the heat transfer connection points (16) and transferred into the greenhouse heating systems (fan col) (not shown).

The water temperature is measured at the water supply temperature probe (22C) and the value is recorded at the mechanical room control panel (22). The water temperature drops proportionally to the transferred energy perform in the heat transfer connection points (16). Upon the obtained value of the water supply temperature probe (22C), the mechanical room control panel (22) will act on the heat pump (18) operations in order to provide the desired energy (Qg) in the greenhouse heating system.

The water circulating in the piping (4C) is pumped through the in-line pumping station (19) into the water/refrigerant heat exchanger (17) acting as the evaporator. In this heat exchanger, the water temperature coming from the cooled water piping (4D) is cooled down proportionally to the injected energy (−Qhp) obtain from the heat pump thermodynamic cycle of (+Qhp) in the water/refrigerant heat exchanger (15) (condenser). When this situation occurs, the airflow temperature in the plenum (7) also drop proportionally and help to cool down the supply air temperature at the ventilation airflow return plenum (9) and (9A). The ventilation supply air temperature at the plenum (9A) needs to be within the recommended temperatures indicated by the manufacturer. This is a advantageous situation in all perspectives. While the heat pump (18) inject heat in the greenhouse at the same time, it cooled the mining room temperature 110. The heat pump can reach a COP (Coefficient Of Performance) of 5 and 6 in this situation.

Then the water temperature is measured at the water return temperature probe (22D) at the connecting point (4) just before entering in the energy recovery coils (3). The water temperature will be relevant of the transferred energy occurs at the heating transfer connection points (16) and the heat exchanger (17) considering that the water flow is the same in all the networks. The flow continues through the main return piping (4) to supply the energy recovery coils (3). This scenario is repeated until (Qg)<(Qm).

Greenhouse heating system control panel (24) is the system that controls all system related to a greenhouse. This control panel (24) communicates with the mechanical room control panel (22) in order to share the required heating load all year long.

Scenario 2—Warm Conditions

When there is no sustainable heating demand by the greenhouse heating system, the bad (Qc) needs to be managed in order to always maintain the appropriate temperature in the mining room 110.

In this scenario the water containing (Qc) continue to flow into the main piping supply (5). The water temperature is measured at the water supply temperature probe (22A) and the value is recorded at the mechanical room control panel (22).

This energy (Qc) moves through the water/refrigerant heat exchanger (15). But no heat transfer is performed.

The water energy contains at the point of the heat exchanger output supply piping (5C) is (Qc) and the water temperature is the same as the one detected by the water supply temperature probe (22A);

If there is a heating load request to the mechanical room control panel (22) from the greenhouse control panel (24) in the greenhouse, the actuator modulating 3-way valve (21) will modulate the water flow in proportion of the heating load requested by the greenhouse control panel (24). The 3-way valve (21) is always controlled by the mechanical room control panel (22).

A percentage of the heat exchanger water piping (5C) water flow will be deviated into the greenhouse heat exchanger supply piping (5D) to and the balance will be directed into the rejection device (20) through the 3-way valve (21A).

Ultimately, the capacity of the heat rejection device (20) is able, at least, encounter the same capacity produced by (Qc)

The water temperature is measured at the water supply temperature probe (22B) before the connecting point to the greenhouse and the value is recorded at the mechanical room control panel (22).

The water temperature is measured at the water supply temperature probe (22C) and the value is recorded at the mechanical room control panel (22). The water temperature drops proportionally to the transferred energy perform in the heat transfer connection points (16) and also to the exceeding energy that has been deviated to the het rejection device (20). Upon the obtained value of the water return temperature probe (22C), the control panel (22) will act on the heat rejection device (20) operations in order to provide the desired temperature at the mining room/air side (9A) in the mining room 110.

The water circulating in the piping (4C) is pumped through the in-line pumping station (19) into the water/refrigerant heat exchanger (17). But no heat transfer is performed.

Then the water temperature is measured at the water return temperature probe (220) at the connecting point (4) just before entering in the energy recovery coils (3). The water temperature will be relevant of the transferred energy occurs at the heating transfer connection points (16) and the heat rejection device (20) considering that the water flow is the same in all the networks.

During the hot season, the priority is focus on the mining room supply air temperature at the mining room/air side (9A) because it needs to be within the manufacturers recommended temperatures. The greenhouse will take the required energy to for example pre-heat irrigation water, heated table, water storage, etc. and all exceeding heating energy is rejected trough the heat rejection device (20).

One should note that through the present document the term "probes" and "sensors" are interchangeable, the probes and sensors collecting data and transmitting data and signals to a system controller driving controllable components of the present heat recuperating system.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the embodiments and non-limiting, and it will be understood by persons skilled in the art that other variants and modifications may be made without departing from the scope of the embodiments as defined in the claims appended hereto.

The invention claimed is:

1. A heat recuperating system for recuperating heat generated by mining devices to be used in agri-food industry applications, the heat recuperating system comprising:
   a technical room comprising an air supply area, an exhausted air area and a computation area dividing the air supply area from the exhausted air area, wherein the computation area houses the mining devices;
   a heat exchanger system recuperating heat from the exhausted air area of the technical room and transmitting the recuperated heat to the agri-food industry applications;
   a system controller; and
   a plurality of sensors transmitting signals to the system controller,
   wherein the system controller, according to sensor signals, drives the heat recuperating system.

2. The heat recuperating system of claim 1, further comprising a heat rejection device adapted to reject heat into environment,
   wherein the heat exchanger system is adapted to controllably drive recuperated heat further to the heat rejection device.

3. The heat recuperating system of claim 1, further comprising airflow driving device to drive an airflow from the air supply area to the exhausted air area.

4. The heat recuperating system of claim 3, wherein the computation area comprises:
   a mounting component adapted to mount the mining devices parallel to each other; and
   an opening fluidly connecting the air supply area to the mounting component wherein the mounting component is oriented for the airflow to travel between the mining devices.

5. The heat recuperating system of claim 3, further comprising a conduit fluidly connecting the exhausted air area and the air supply area, and
   wherein the airflow driving device drives the airflow from the exhausted air area to the air supply area.

6. The heat recuperating system of claim 1, wherein the heat exchanger further comprises at least one of: a) a fan coil; b) a thermal storage tank; c) a water heater adapted for preheating cold water; d) a radiant heating system adapted for crops tables; and e) a greenhouse watering system,
   through which the heat exchanger is adapted to transmit recuperated heat to the agri-food industry applications.

7. The heat recuperating system of claim 1, further comprising a high-speed communication system for connecting the mining devices to Internet.

8. A heat recuperating system for recuperating heat generated by mining devices to be used in agri-food industry applications, the heat recuperating system comprising:
   a technical room comprising an air supply area, an exhausted air area and a computation area dividing the air supply area form the exhausted air area, wherein the computation area houses the mining devices;
   a heat exchanger system recuperating heat from the exhausted air area of the technical room and transmitting the recuperated heat to the agri-food industry applications; and
   a dust control system, wherein the dust control system provides a dust-free airflow for cooling down the mining devices.

9. A method of recuperating heat generated by mining devices to be used in agri-food industry applications, the method of recuperating heat comprising:
   supplying a technical room comprising a computation area wherein the mining devices are operating;
   supplying a heat exchanger system recuperating the heat generated by the mining devices when operating;
   transmitting the recuperated heat to the agri-food industry applications;
   supplying a heat rejection device adapted to reject the heat into environment, wherein the heat exchanger system is adapted to controllably drive recuperated heat further to the heat rejection device.

10. The method of recuperating heat of claim 9, further comprising:
    connecting the mining devices to Internet; and
    registering the mining devices in a peer-to-peer network.

11. The method of recuperating heat of claim 9, wherein operating the mining devices comprises the mining devices performing hash functions.

12. The method of recuperating heat of claim 9, further comprising:
    connecting the mining devices to Internet; and
    registering the mining devices into a cryptocurrency network, whereby the mining devices performs mining operations.

13. The method of recuperating heat of claim 9, further comprising:
    connecting the mining devices to Internet; and
    registering the mining devices into a network operating according to a protocol of decentralized transactions.

14. The method of recuperating heat of claim 9, wherein the mining devices are cryptocurrency miners.

15. The method of recuperating heat of claim 9, wherein the technical room comprises an air supply area and an exhausted air area, and
    wherein the computation area divides the air supply area from the exhausted air area.

16. The method of recuperating heat of claim 9, further comprising supplying at least one of a) a fan coil; b) a thermal storage tank; c) a water heater adapted for preheating cold water; d) a radiant heating system adapted for crops tables; and e) a greenhouse watering system, through which the heat exchanger system is adapted to transmit the recuperated heat to the agri-food industry applications.

17. The method of recuperating heat of claim 9, further comprising:
    monitoring heat requirements of the agri-food industry applications; and
    one of increasing and decreasing an operating number of the mining devices based on the monitored heat requirements.

18. A method of recuperating heat generated by mining devices to be used in agri-food industry applications, the method of recuperating heat comprising:
    supplying a technical room comprising a computation area wherein the mining devices are operating;
    supplying a heat exchanger system recuperating the heat generated by the mining devices when operating;
    transmitting the recuperated heat to the agri-food industry applications;
    supplying a system controller; and
    supplying a plurality of sensors transmitting signals to the system controller,
    wherein the system controller, according to sensor signals, drives the heat exchanger system.

* * * * *